US00RE39582E

(19) United States
(12) Reissued Patent
Luhm

(10) Patent Number: US RE39,582 E
(45) **Date of Reissued Patent: *Apr. 24, 2007**

(54) METHOD FOR REPLACING A TACKING FASTENER

(75) Inventor: Ralph Luhm, La Habra, CA (US)

(73) Assignee: Allfast Fastening Systems, Inc., City of Industry, CA (US)

( * ) Notice: This patent is subject to a terminal disclaimer.

(21) Appl. No.: 10/131,629

(22) Filed: Mar. 6, 2002

Related U.S. Patent Documents

Reissue of:
(64) Patent No.: 5,689,873
Issued: Nov. 25, 1997
Appl. No.: 08/746,132
Filed: Nov. 6, 1996

U.S. Applications:
(60) Continuation of application No. 09/444,537, filed on Nov. 22, 1999, which is a division of application No. 08/584,111, filed on Jan. 11, 1996, now abandoned.

(51) Int. Cl.
*F16B 13/04* (2006.01)
*B23P 11/00* (2006.01)

(52) U.S. Cl. ..... 411/43; 411/69; 411/70; 411/501; 29/525.11

(58) Field of Classification Search ..... 411/69, 411/70, 43, 501; 408/1 R, 84; 29/426.4, 525.11
See application file for complete search history.

(56) References Cited

U.S. PATENT DOCUMENTS

| | | | |
|---|---|---|---|
| 1,120,411 A | 12/1914 | Rohmer | |
| 1,941,551 A | 1/1934 | Gjertsen | 408/84 |

(Continued)

FOREIGN PATENT DOCUMENTS

| | | |
|---|---|---|
| CH | 654762 | 3/1986 |
| FR | 2622257 | 10/1987 |
| GB | 472329 | * 9/1937 |
| GB | 510482 | 5/1938 |
| GB | 1 323 873 | 7/1973 |
| GB | 2 155 578 A | 9/1985 |
| JP | SHO 53-6302 | 1/1978 |
| JP | SHO 60-211111 | 10/1985 |

OTHER PUBLICATIONS

H.V.Ross, Contoured Punch Tool for Removing Semi–Tubular Rivets, United States Statutory Invention registration, reg. No. H419, pub. Feb. 2, 1988.

*Primary Examiner*—Michael Safavi
(74) *Attorney, Agent, or Firm*—Blakely Sokoloff Taylor & Zafman LLP

(57) ABSTRACT

[A temporary fastener that fastens two adjacent workpieces. The fastener includes a shank that extends through a hole of the workpieces. Extending from one end of the shank is a conical shaped head. The fastener also contains a pull stem which has a head located adjacent to the blind end of the shank. The stem head is pulled through the shank to expand and tightly fasten the shank to the workpieces. The fastener is removed by drilling through the head and the shank. The diameter of the conical shank head is smaller than the diameter of the drill so that part of the head does not become attached to the drill bit and scratch the workpiece. The conical shape of the head also reduces the volume of fastener material to further reduce the size and amount of chips produced during the drilling process. The tightly engaged shank prevents the fastener from rotating during the drilling operation.] *A method of replacing a tacking fastener that temporarily joins two adjacent workpieces with a permanent fastener to permanently join the workpieces. A drill bit is engaged with an inner channel of the temporary fastener at a head of the fastener. The drill bit has a diameter larger than the head diameter. The head, the shank, the first workpiece, and the second workpiece are drilled through to form a hole through the workpieces. The first workpiece and the second workpiece are joined with a permanent fastener through the hole.*

10 Claims, 2 Drawing Sheets

U.S. PATENT DOCUMENTS

| | | | | | |
|---|---|---|---|---|---|
| RE20,055 | E | | 8/1936 | Huck | 218/29 |
| 2,061,628 | A | | 11/1936 | Huck | 218/29 |
| RE21,058 | E | | 4/1939 | Huck | 218/29 |
| 2,385,886 | A | | 10/1945 | Shaff | 85/40 |
| 2,536,353 | A | | 1/1951 | Cooper | 411/70 |
| 2,538,623 | A | | 1/1951 | Keating | 85/40 |
| 2,545,752 | A | | 3/1951 | Singleton | 85/40 |
| 2,546,602 | A | | 3/1951 | Keating | 85/40 |
| 2,652,741 | A | | 9/1953 | Ketchum et al. | 85/40 |
| 2,756,624 | A | | 7/1956 | Austin | 85/40 |
| 3,038,626 | A | | 6/1962 | Simmons | 218/42 |
| 3,178,989 | A | | 4/1965 | Siebol | 85/71 |
| 3,257,890 | A | | 6/1966 | Kraemer | 85/72 |
| 3,285,121 | A | | 11/1966 | Siebol | 411/43 |
| 3,292,482 | A | | 12/1966 | Fry et al. | 85/78 |
| 3,300,798 | A | | 1/1967 | York | 10/27 |
| 3,309,747 | A | | 3/1967 | Smith | 24/208 |
| 3,348,444 | A | | 10/1967 | Brignola | 85/70 |
| 3,515,419 | A | | 6/1970 | Baugh | 287/189 |
| 3,553,040 | A | | 1/1971 | Bell | 156/3 |
| 3,643,544 | A | | 2/1972 | Massa | 85/72 |
| 3,657,957 | A | | 4/1972 | Siebol | 411/70 |
| 3,693,247 | A | * | 9/1972 | Brown | 29/512 |
| 3,880,042 | A | | 4/1975 | Binns | 85/72 |
| 3,937,123 | A | | 2/1976 | Matuschek et al. | 85/72 |
| 3,953,906 | A | * | 5/1976 | Brown | 470/28 |
| 4,044,591 | A | | 8/1977 | Powderley | 72/391 |
| 4,074,608 | A | | 2/1978 | Siebol | 85/71 |
| 4,089,249 | A | | 5/1978 | Binns | 85/72 |
| 4,137,817 | A | | 2/1979 | Siebol | 85/78 |
| 4,168,650 | A | | 9/1979 | Dahl et al. | 85/70 |
| 4,170,919 | A | | 10/1979 | Siebol | 85/71 |
| 4,170,920 | A | | 10/1979 | Siebol | 85/72 |
| 4,211,145 | A | | 7/1980 | Dolch | 85/72 |
| 4,222,304 | A | | 9/1980 | Yoshida et al. | 85/71 |
| 4,230,017 | A | | 10/1980 | Angelosanto | 85/70 |
| 4,261,245 | A | | 4/1981 | Mauer | 411/43 |
| 4,285,265 | A | | 8/1981 | Rieper | |
| 4,293,258 | A | | 10/1981 | McKewan | 411/30 |
| 4,312,613 | A | | 1/1982 | Binns | 411/34 |
| 4,355,934 | A | | 10/1982 | Denham et al. | 411/38 |
| 4,364,697 | A | | 12/1982 | Binns | 411/38 |
| 4,367,994 | A | | 1/1983 | Francis et al. | 411/43 |
| 4,370,081 | A | | 1/1983 | Briles | 411/43 |
| 4,388,031 | A | | 6/1983 | Rodgers | 411/43 |
| 4,407,619 | A | | 10/1983 | Siebol | 411/43 |
| 4,451,189 | A | | 5/1984 | Pratt | 411/34 |
| 4,451,959 | A | | 6/1984 | Miller et al. | |
| 4,473,914 | A | | 10/1984 | Haft | 10/11 R |
| 4,556,351 | A | | 12/1985 | Wollar et al. | 411/38 |
| 4,579,491 | A | | 4/1986 | Kull | 411/43 |
| 4,580,936 | A | | 4/1986 | Francis et al. | 411/38 |
| 4,585,383 | A | | 4/1986 | Kraemer | 411/38 |
| 4,609,315 | A | | 9/1986 | Briles | 411/43 |
| 4,609,317 | A | | 9/1986 | Dixon et al. | 411/339 |
| 4,615,655 | A | | 10/1986 | Dixon | 411/339 |
| 4,620,825 | A | | 11/1986 | Potzas | 411/34 |
| 4,627,775 | A | | 12/1986 | Dixon | 411/34 |
| 4,629,381 | A | | 12/1986 | Bateman | |
| 4,639,174 | A | | 1/1987 | Denham et al. | 411/34 |
| 4,678,384 | A | | 7/1987 | Sparling et al. | 411/43 |
| 4,696,610 | A | | 9/1987 | Wright | 411/38 |
| 4,702,655 | A | | 10/1987 | Kendall | 411/43 |
| 4,736,560 | A | | 4/1988 | Murphy | 52/410 |
| 4,765,787 | A | | 8/1988 | Briles | 411/41 |
| 4,781,500 | A | | 11/1988 | Mauer | 411/36 |
| 4,781,501 | A | | 11/1988 | Jeal et al. | 411/69 |
| 4,784,551 | A | | 11/1988 | Kendall | 411/43 |
| 4,789,283 | A | | 12/1988 | Crawford | 411/43 |
| 4,826,372 | A | | 5/1989 | Kendall | 411/43 |
| 4,836,728 | A | | 6/1989 | Mauer et al. | 411/43 |
| 4,850,771 | A | | 7/1989 | Hurd | 411/43 |
| 4,859,128 | A | | 8/1989 | Brecz et al. | 411/43 |
| 4,863,325 | A | | 9/1989 | Smith | 411/43 |
| 4,865,499 | A | | 9/1989 | Lacey | 411/34 |
| 4,877,363 | A | | 10/1989 | Williamson et al. | 411/43 |
| 4,900,205 | A | | 2/1990 | Sadri | 411/38 |
| 4,907,922 | A | | 3/1990 | Jeal et al. | 411/43 |
| 4,909,687 | A | | 3/1990 | Bradley et al. | 411/43 |
| 4,919,576 | A | | 4/1990 | Louw et al. | 411/34 |
| 4,950,115 | A | | 8/1990 | Sadri | 411/38 |
| 4,958,971 | A | | 9/1990 | Lacey et al. | 411/38 |
| 4,968,198 | A | | 11/1990 | Binns | 411/38 |
| 4,988,247 | A | | 1/1991 | Summerlin | 411/38 |
| 4,990,042 | A | | 2/1991 | Szayer et al. | 411/29 |
| 5,006,024 | A | | 4/1991 | Siebol | 411/70 |
| 5,030,050 | A | | 7/1991 | Auriol et al. | 411/38 |
| 5,044,850 | A | | 9/1991 | Getten et al. | 411/43 |
| 5,052,870 | A | | 10/1991 | Pratt et al. | 411/43 |
| 5,135,340 | A | | 8/1992 | Stinson | 411/34 |
| 5,141,373 | A | | 8/1992 | Kendall | 411/43 |
| 5,197,838 | A | | 3/1993 | Schwab | 411/43 |
| 5,228,811 | A | | 7/1993 | Potter | |
| 5,318,390 | A | | 6/1994 | DalBianco | |
| 5,320,465 | A | | 6/1994 | Smith | 411/43 |
| 5,346,348 | A | | 9/1994 | Denham | 411/43 |
| 5,551,816 | A | | 9/1996 | Brewer et al. | |

* cited by examiner

FIG. 1
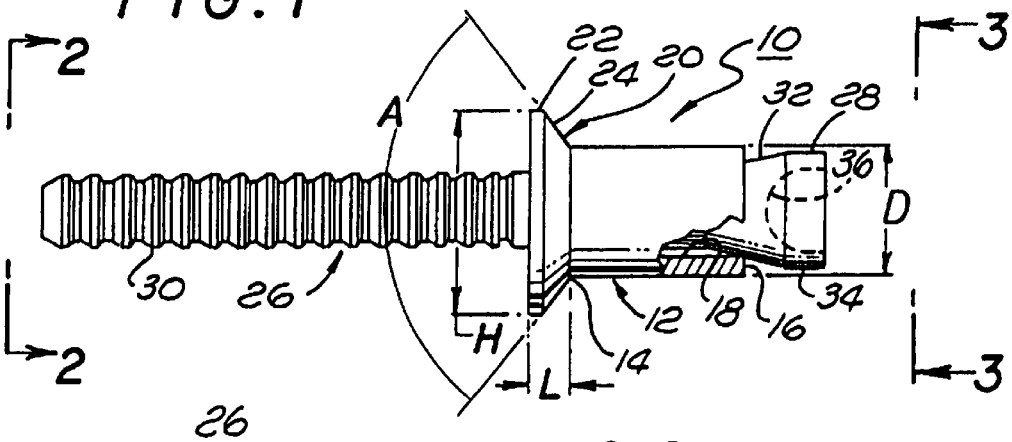
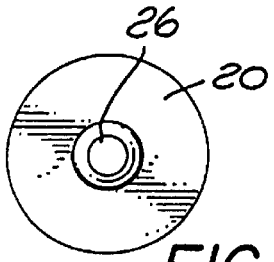
FIG. 2
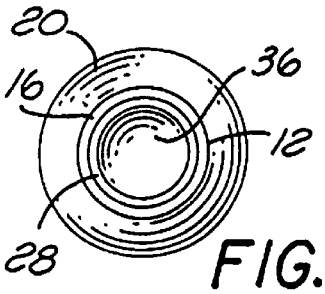
FIG. 3
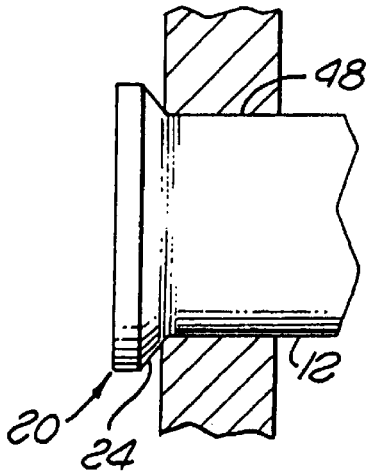
FIG. 6
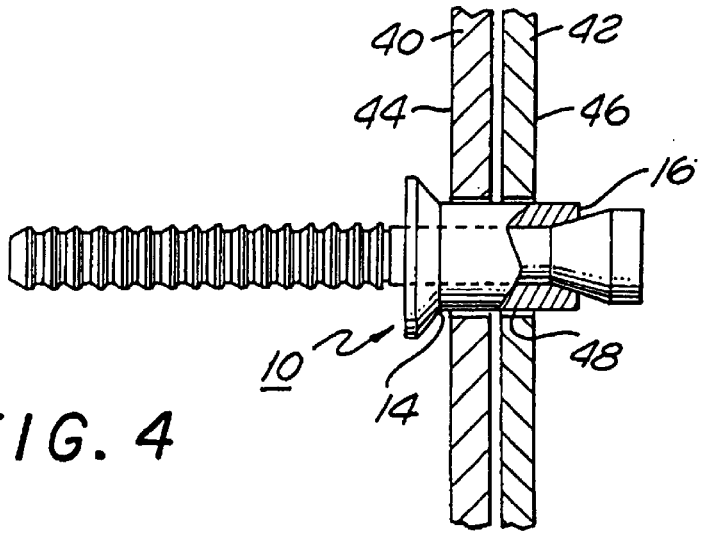
FIG. 4

METHOD FOR REPLACING A TACKING FASTENER

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 5,689,873. The reissue applications are application Ser. Nos. 09/444,537 and 10/131,629 (the present application) which is a continuation of Ser. No. 09/444,537, all of which are reissues of U.S. Pat. No. 5,689,873.*

This is *a Continuation of Reissue application Ser. No. 09/444,537, filed Nov. 22, 1999 pending, for reissue of U.S. Pat. No. 5,689,873, filed Nov. 6, 1996 and issued Nov. 25, 1997, which issued from* a Divisional application of application Ser. No. 08/584,111, filed Jan. 11, 1996 now abandoned.

BACKGROUND OF THE INVENTION

1. Field of the Invention

The present invention relates to *metal working and more particularly to a method for assembling that includes disassembling by destroying a temporary connector to create a hole for* a *permanent separate* fastener for temporarily fastening two adjacent workpieces.

2. Description of Related Art

The fuselage of an airplane is constructed from a number of individual panels that are fastened to a frame by a plurality of rivets. Temporary fasteners are typically installed into adjacent parts to insure that the workpieces do not become separated during the installation of the permanent rivets. The temporary fasteners are eventually removed and replaced with a permanent rivet.

Some areas of the aircraft are not fully accessible, thereby requiring the use of a blind rivet which can be installed from only one side of a workpiece. Temporary blind fasteners typically contain a shank which extends through a hole drilled through the workpieces. The shank has a head which prevents the fastener from falling into the "blind" side of the assembly. The fastener also contains a pull stem which has a stem head located at the blind end of the shank. The stem head is pulled through the shank to expand the shank and secure the fastener to the workpieces. The temporary fastener is eventually removed by drilling through the head and the shank with a drill of the proper diameter for the shank of the permanent rivet to be installed.

It has been found that drilling temporary blind fasteners of the prior art may create splinters and portions of the head that can scratch the surface of the outer workpiece. Additionally, although the head and enlarged shank end prevent the fastener from falling out of the hole, it has been found that the shank may rotate with the drill bit before the head is totally drilled out, preventing further penetration of the drill. Also the rotation of the shank and head remnants spins the splinters and drill chips to further scratch the surface of the workpiece. It would therefore be desirable to provide a temporary fastener that is easy to remove and does not create scratches on the workpiece surfaces.

SUMMARY OF THE INVENTION

[The present invention is a temporary fastener for fastening two or more adjacent workpieces. The fastener includes a shank that extends through a hole of the workpieces. Extending from one end of the shank is a conical shaped head. The fastener also contains a pull stem which has a head located adjacent to the blind end of the shank. The stem head is pulled through the shank to expand and tightly fasten the shank to the workpieces. The fastener is removed by drilling through the head and the shank.] *The present invention is a method of replacing a tacking fastener that temporarily joins two adjacent workpieces with a permanent fastener to permanently join the workpieces. A drill bit is engaged with an inner channel of the temporary fastener at a head of the fastener. The drill bit has a diameter larger than the head diameter. The head, the shank, the first workpiece, and the second workpiece are drilled through to form a hole through the workpieces. The first workpiece and the second workpiece are joined with a permanent fastener through the hole.*

[The diameter of the conical shank head is smaller than the diameter of the drill so that part of the head does not become attached to the drill bit and scratch the workpiece. The conical shape of the head also reduces the volume of fastener material to further reduce the size and amount of chips produced during the drilling process. The tightly engaged shank prevents the fastener from rotating during the drilling operation.]

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a side view of a tacking fastener of the present invention;

FIG. 2 is a front end view of the tacking fastener of FIG. 1;

FIG. 3 is a rear end view of the tacking fastener of FIG. 1;

FIG. 4 is a side sectional view showing the fastener inserted into a hole of two adjacent workpieces;

FIG. 6 is an enlarged side view of the shank head pressed into the workpiece;

DETAILED DESCRIPTION OF THE INVENTION

Figure 5:
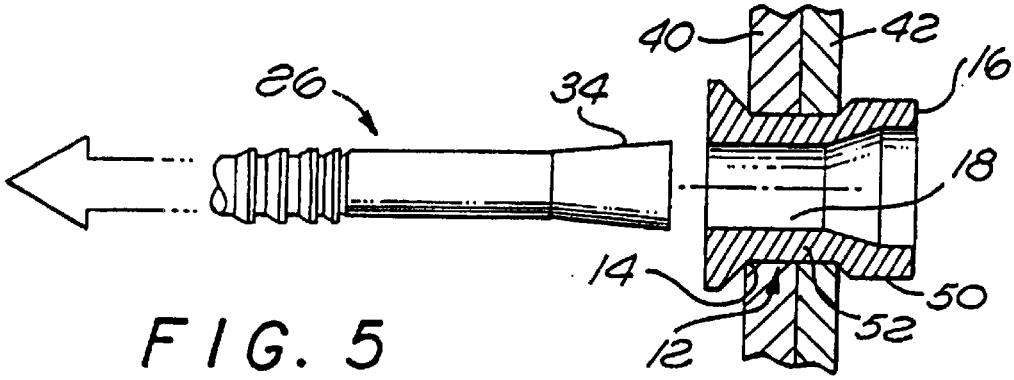
FIG. 5 is a side view similar to FIG. 4 showing a stem pulled through a shank of the fastener.

Referring to the drawings more particularly by reference numbers, FIGS. 1 through 3 show a tacking fastener 10 of the present invention. The tacking fastener 10 is typically used to temporarily fasten together two adjacent workpieces. The fastener 10 includes a shank 12 which has a first end 14, a second end 16 and an inner channel 18 that extends through the shank 12. Extending from the first end 14 of the shank 12 is a conical shaped head 20. The head 20 has an annular lip portion 22 that is separated from the first end 14 by a tapered portion 24.

The fastener 10 includes a pull stem 26 that extends through the inner channel 18 of the shank 12. The pull stem 26 has a stem head 28 that is located adjacent to the second end 16 of the shank 12. The stem 26 also has a serrated pull portion 30 that can be gripped by a pull gun (not shown) to pull the head 28 through the inner channel 18 of the shank 12. The stem head 28 may have a tapered portion 32 which leads the head 28 into the inner channel 34. The tapered portion 32 extends to an annular tip portion 34. The tip portion 34 typically has a diameter larger than the diameter of the inner channel 18 so that the head 28 expands the shank 12 as the stem 26 is pulled through the channel 18. The stem head 28 may have an inner cavity 36 which allows the head 28 to contract as the stem 26 is pulled through the shank 12, particularly as the shank expands tightly into the surrounding hole in the work pieces.

In the preferred embodiment, the shank 12 is constructed from an aluminum material and the pull stem 26 is constructed from a steel material. The fastener 10 preferably has the dimensions listed in Table I. Various embodiments are listed, each embodiment corresponding to a particular size of permanent fastener which will replace the tacking fastener 10. For example, the first row of values provide dimensions for a tacking fastener 10 that corresponds to a permanent fastener which has a 0.1562 inch diameter, the second row relates to a permanent fastener diameter of 0.1875 inches and so forth and so on. All dimensions are in inches.

TABLE I

| PERMANENT FASTENER DIAMETER | SHANK DIAMETER D | HEAD DIAMETER H | HEAD LENGTH L | INSTALLATION HOLE DIAMETER | DRILL SIZE FOR PERMANENT FASTENER |
|---|---|---|---|---|---|
| 0.1562 | 0.093–0.097 | 0.128 | 0.036 | 0.098–0.107 | #20 |
| 0.1875 | 0.125–0.128 | 0.170 | 0.042 | 0.1285–0.1436 | #10 |
| 0.250 | 0.155–0.159 | 0.212 | 0.055 | 0.160–0.178 | #F |

FIGS. 4 through 8 show the installation of a fastener 10 to temporarily attach a first workpiece 40 to an adjacent second workpiece 42. The first workpiece 40 typically has an outer flat surface 44. The second workpiece 42 has a blind surface 46. The blind surface 46 is typically inaccessible to the operator installing the fastener 10.

As shown in FIG. 4, the hole 48 is initially drilled through the first 40 and second 42 workpieces. The hole 48 is typically larger than the diameter of the shank 12 so that the shank 12 and stem head 28 can be easily inserted into the workpieces 40 and 42. The stem head 26 and second end 16 of the shank 12 extend from the blind surface 46 of the second workpiece 42.

As shown in FIG. 5, the stem 26 is pulled through the shank 12. The stem head 28 initially expands the second end 16 of the shank 12 to create an upset portion 50 which bears against the second workpiece 42. As the head 28 is pulled through the workpieces, the head 28 expands the inner shank portion 52 into tight engagement with the parts 40 and 42. Movement of the head 28 through the workpieces also contracts the annular tip portion 34 into the head cavity 36 to reduce the diameter of the stem head 28. The resultant inner channel 18 is thus smaller in the shank portion 52 than the upset portion 50.

As shown in FIG. 6, the conical head 20 is seated into the first workpiece 40 when the stem 26 is pulled through the shank 12. The tapered surface 24 of the head 20 will center the shank 12 with a hole 48 even when the hole diameter varies from a nominal dimension. The installed fastener 10 typically holds together the first 40 and second 42 workpieces while an operator installs permanent fasteners into the workpieces 40 and 42. The temporary fastener 10 is eventually removed and replaced with a permanent fastener.

Figure 7:
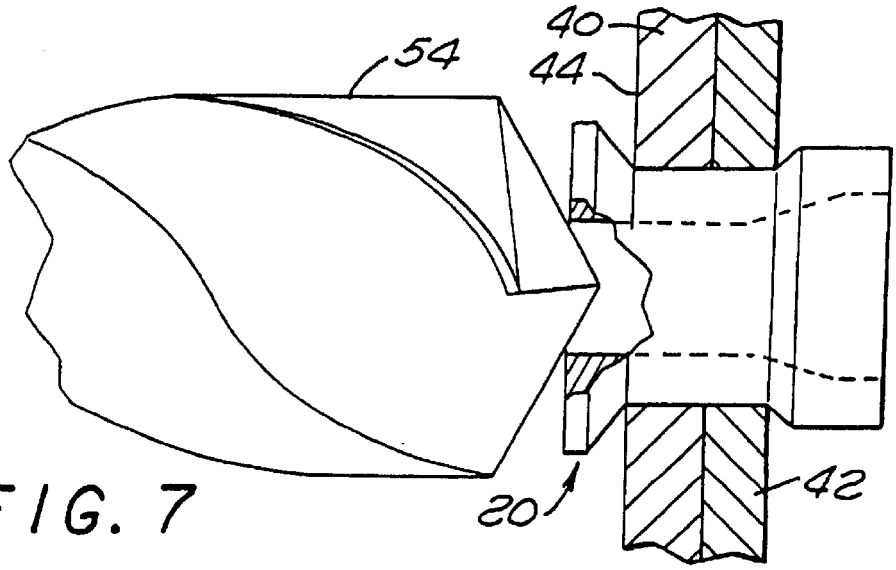
FIG. 7 is a side view showing a drill positioned to initiate drilling.
Figure 8:
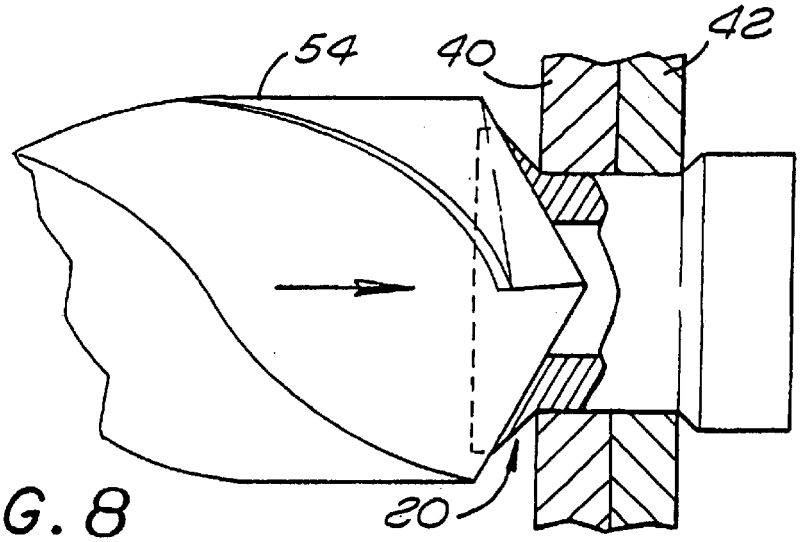
FIG. 8 is a side view similar to FIG. 7 showing the drill drilling through the shank head.

As shown in FIGS. 7 and 8, a drill bit 54 drills through the head 20, the shank 12 and the workpieces 40 and 42 to remove the temporary fastener 10 and create a hole for a permanent fastener (not shown). The head 20 has a diameter that is smaller than the diameter of the drill bit 54. The smaller head diameter reduces the possibility of the head material splintering and otherwise sticking to the drill 54 and scratching the outer surface 44. Additionally, the conical shape of the head 20 reduces the amount of fastener material that is removed by the drill and thus reduces the amount of drill chips produced during the drilling operation.

The expanded shank 12 is in tight engagement with the workpieces so that the fastener does not spin during the drill process. Additionally, the angle A of the conical head 20 is preferably different than the drill angle of the drill bit 54. The different angles reduce the amount of slippage between the bit 54 and the head 20. In the preferred embodiment, the angle A is 100°, with the corresponding angle of the drill being 120°. This assures that the head will finally drill out from outer diameter to inner diameter, thereby preventing the separation of a washer-like section of the head to clog the drill and cause the same to stop drilling, and perhaps to wander to damage the work piece. The present invention thus provides a temporary fastener that does not spin or create scratches on the workpiece when removed by a drill.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

[1. A method for creating a hole for a permanent fastener which fastens a first workpiece to an adjacent second workpiece, comprising the steps of:

a) providing a tacking fastener that includes a shank which has an inner channel, a first end, a second end and a conical shaped head which extends from said first end, said tacking fastener further includes a stem that extends through said inner channel of said shank and has a head located adjacent to said second end of said shank;

b) drilling a first hole through the first and second workpieces;

c) inserting said shank and said stem into said first hole so that said stem head extends from the second workpiece and said conical shaped head is adjacent to the first workpiece;

d) pulling said stem head through said inner channel to expand said shank and secure said shank to the first and second workpieces; and, e) drilling said conical shaped head, said shank and the first and second workpieces a drill bit that has a diameter larger than a diameter of said conical shaped head.]

[2. The method as recited in claim 1, wherein said stem head is deflected when said stem head is pulled through said inner channel of said shank.]

[3. The method as recited in claim 1, wherein said drill bit has a drill angle that is different than an angle of said conical shaped head.]

[4. The method as recited in claim 1, further comprising the step of inserting a permanent fastener after step (e).]

[5. A method for creating a hole for a permanent fastener which fastens a first workpiece to an adjacent second workpiece, comprising the steps of:

a) providing a tacking fastener that includes a shank which has an inner channel, a first end, a second end and a shank head which extends from said first end, said tacking fastener further includes a stem that extends through said inner channel of said shank and has a head located adjacent to said second end of said shank;

b) drilling a first hole through the first and second workpieces;

c) inserting said shank and said stem into said first hole so that said stem head extends from the second workpiece and said shank head is adjacent to the first workpiece;

d) pulling said stem head through said inner channel to expand said shank and secure said shank to the first and second workpieces; and, e) drilling said shank head, said shank and the first and second workpieces a drill bit that has a diameter larger than a diameter of said conical shaped head.]

[6. The method as recited in claim 5, wherein said stem head is deflected when said stem head is pulled through said inner channel of said shank.]

[7. The method as recited in claim 5, further comprising the step of inserting a permanent fastener after step (e).]

[8. A method for creating a hole for a permanent fastener which fastens a first workpiece to an adjacent second workpiece, wherein the first workpiece has a flat outer surface, comprising the steps of:

a) providing a tacking fastener that includes a shank which has an inner channel, a first end, a second end and a conical shaped head which extends from said first end, said tacking fastener further includes a stem that extends through said inner channel of said shank and has a head located adjacent to said second end of said shank;

b) drilling a first hole through the first and second workpieces;

c) inserting said shank and said stem into said first hole so that said stem head extends from the second workpiece and said conical shaped head extends from the flat outer surface of the first workpiece;

d) pulling said stem head through said inner channel to expand said shank and secure said shank to the first and second workpieces; and, e) drilling said conical shaped head, said shank and the first and second workpieces with a drill bit that has a diameter larger than a diameter of said conical shaped head.]

[9. The method as recited in claim 8, wherein said stem head is deflected when said stem head is pulled through said inner channel of said shank.]

[10. The method as recited in claim 8, wherein said drill bit has a drill angle that is different than an angle of said conical shaped head.]

[11. The method as recited in claim 8, further comprising, the step of inserting a permanent fastener after step (e).]

*12. A method of replacing a tacking fastener that temporarily joins a first workpiece and a second workpiece with a permanent fastener to permanently join the workpieces, said tacking fastener including a shank of a cylindrical shape with a first end and an opposing second end, a head having a head diameter joined to the shank at the first end, and an inner channel coaxial with and open at the head, said head placed adjacent to the first workpiece, said shank extending through the workpieces, said shank deformed adjacent to the second workpiece to join the workpieces, said method comprising:*

*engaging a drill bit with the inner channel at the head, said drill bit having a diameter larger than the head diameter;*

*drilling the head, the shank, the first workpiece, and the second workpiece to form a hole through the workpieces; and*

*joining the first workpiece and the second workpiece with the permanent fastener, said permanent fastener extending through the hole.*

*13. The method as recited in claim 12, wherein the head diameter is about 0.13 inches and the drill bit is a #20 size drill bit.*

*14. The method as recited in claim 12, wherein the head diameter is about 0.17 inches and the drill bit is a #10 size drill bit.*

*15. The method as recited in claim 12, wherein the head diameter is about 0.21 inches and the drill bit is a #F size drill bit.*

*16. The method as recited in claim 12, wherein deforming the shank includes expanding the second end.*

*17. The method as recited in claim 12, wherein expanding the shank includes expanding a portion of the shank that is enclosed by the workpieces.*

*18. The method as recited in claim 12, wherein:*

*the shank includes a first portion that is enclosed by the workpieces and a second portion that extends from the second workpiece;*

*deforming the shank includes expanding the first portion of the shank to tightly engage the workpieces and expanding the second portion to bear against the second workpiece.*

*19. The method as recited in claim 12, wherein the inner channel of the tacking fastener is a cylindrical opening coaxial with the shank and extending from the second end to a surface of the head that is opposite to and furthest from the second end, and deforming the shank includes expanding the cylindrical opening to provide an open coaxial passage from the head to the second end.*

*20. The method as recited in claim 12, wherein the tacking fastener is a tubular rivet.*

*21. The method as recited in claim 20, wherein the tubular rivet is constructed from an aluminum material.*

* * * * *